United States Patent
Lee et al.

(10) Patent No.: US 8,562,700 B2
(45) Date of Patent: Oct. 22, 2013

(54) MULTI-FUNCTIONAL COMPACT FUEL CONVERTER AND A PROCESS FOR CONVERTING LIQUID FUEL

(75) Inventors: Ivan C. Lee, Silver Spring, MD (US); Christopher M. Waits, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 491 days.

(21) Appl. No.: 12/870,916

(22) Filed: Aug. 30, 2010

(65) Prior Publication Data
US 2012/0052002 A1 Mar. 1, 2012

(51) Int. Cl.
*B01J 7/00* (2006.01)

(52) U.S. Cl.
USPC .............................. 48/127.9; 48/61

(58) Field of Classification Search
None
See application file for complete search history.

(56) References Cited

U.S. PATENT DOCUMENTS

| 6,951,456 B2 | 10/2005 | Cohen et al. |
| 2002/0185113 A1* | 12/2002 | Kato ........................ 123/456 |
| 2004/0209205 A1 | 10/2004 | Gomez |
| 2007/0111146 A1 | 5/2007 | Gomez |
| 2007/0151154 A1 | 7/2007 | Lyubovsky et al. |
| 2007/0293713 A1* | 12/2007 | Schmidt et al. ............... 585/658 |
| 2008/0127553 A1* | 6/2008 | Roychoudhury et al. ........ 48/95 |
| 2009/0293358 A1 | 12/2009 | Roychoudhury et al. |

OTHER PUBLICATIONS

Edward C. Wanat et al, "Partial oxidation of alcohols to produce hydrogen and chemicals in millisecond-contact time reactors," 235 Journal of Catalysis 18-27 (2005).
J.R. Salge et al, "Catalytic partial oxidation of ethanol over noble metal catalysts," 235 Journal of Catalysis 69-78 (2005).
Alessandro Gomez, "Laminar Spray Applications: Meso- and Microscale Combustion," First Brazilian School of Combustion, Brazil (2007) (slides).
Dimitrios C. Kritsis et al, "Optimization of a catalytic combustor using electrosprayed liquid hydrocarbons for mesoscale power generation," 139 Combustion and Flame p. 77-89 (2004).

* cited by examiner

*Primary Examiner* — Imran Akram
(74) *Attorney, Agent, or Firm* — John H. Raubitschek; Eric B. Compton

(57) ABSTRACT

A compact multi-functional fuel converter and a process for converting liquid fuel to a product, which includes providing a supply of oxygen gas, providing a supply of liquid fuel, electrically atomizing the fuel, evaporating the fuel and catalytically reacting the liquid fuel and oxygen in the reactor.

7 Claims, 8 Drawing Sheets

MULTI-FUNCTIONAL COMPACT FUEL CONVERTER AND A PROCESS FOR CONVERTING LIQUID FUEL

GOVERNMENT INTEREST

The presently disclosed subject matter was made with U.S. Government support by the Army Research Laboratory. Thus, the United States Government has certain rights in the disclosed subject matter. The embodiments described and claimed herein may be manufactured, used, sold, imported and/or licensed by or for the United States Government without the payment of royalties thereon.

BACKGROUND

The embodiments of the invention described herein relate generally to combustors, and to methods, tests, and devices for a multi-functional fuel converter. In particular, the embodiments relate to a multi-functional converter based on catalytic combustion and electrostatic injection technologies.

The Army has a need for small portable power systems to support a range of operations including but not limited to being carried by a soldier, or located in unmanned aerial vehicles (UAVs), remotely powered vehicles (RPVs), and unmanned ground vehicles (UGV). Typically, these power systems are battery operated, and as such, are limited with regard to power density, payload and performance duration. Thus, the use of combustion of energy dense liquid fuels such as, for example, ethanol, 1-butanol and Jet Propellant 8 (JP-8) in a compact manner is an attractive alternative to the battery option. Specifically, these dense liquid fuels function in a catalytic micro-combustor and combust at temperatures that can be used in energy conversion devices. However, although micro-combustors have the potential to outperform batteries, the current technology is limited with regard to system run time and reliability due to inefficient fuel-based energy conversion and poor fuel atomization at small flow rates (e.g., <10 mL/hour). As such, in order to improve system efficiency and reliability, the present invention, among other things, offers a catalytic fuel converter for small or micropower devices based on catalytic combustion and electrostatic injection technologies.

It is widely known by those having ordinary skill in the art that there are two parameters critical to the process of miniaturizing a combustor: time/length scales for complete evaporation/mixing and thermal management. Specifically, the time and length scales are vital because complete evaporation must occur in order for the gas-phase fuel and air to mix sufficiently for combustion on the catalyst. Further, maintaining autothermal combustion at the microscale requires catalytic combustion to reduce the temperature of stable combustion. The catalyst material is key because different catalysts are more catalytically active (i.e., have shorter reaction time scales) than others and as such, can produce higher catalytic conversions with lower surface areas. The smaller more effective catalysts require less space and can allow the reaction zone of the combustor to decrease in size, thereby affecting the overall size of the combustor.

The optimization of catalysts has been a major area of research. In particular, experiments have been conducted with catalysts composed of thermally stabilized, ion-exchanged zeolite, palladium on stabilized alumina, and catalysts doped with Cerium (Ce) and Nickel (Ni) to better prevent sulfur poisoning when using JP-8. It has been determined that catalysts can lower the activation barrier of a reaction, thereby allowing the reaction pathway to occur at lower temperatures than homogeneous reactions. This is extremely advantageous because it allows for combustion temperatures ranging between 650 K and 850 K, which are ideal for lead telluride (PbTe) thermoelectric devices. Conversely, homogeneous gas phase flame-combustion reactions of ethanol were carried out in the literature but typical reactor wall temperatures for these types of reactions can exceed 1200 K, which is far too high for any economically viable energy conversion device. At these high temperatures, construction materials for the microcombustor system may crack or melt and as such, the choice of materials becomes limited.

Oxygenates, such as ethanol and 1-butanol, are energy dense and well known to have characteristics that are desirable to miniaturize conventional combustors with regard to catalytic combustion. For instance, they are easily renewable from biomass, and possess simple straight-chain chemical structures. Further, ethanol and 1-butanol both become liquids at room temperature and boil at 351.4 K and 390.7 K, respectively. Additionally, the two alcohols are single components, not a combination of components having different boiling points and viscosities, which consequently enable simpler evaporation and diffusion models when attempting to predict their behavior. Further, they burn clean meaning complete combustion results in the production of $CO_2$ and water. Moreover, it has been determined that both ethanol and 1-butanol are electrically conductive enough such that they can be injected using alternative fuel injection techniques, including but not limited to electrospraying techniques.

Electrospraying techniques are generally techniques that employ electrostatics to disperse a liquid (e.g., fuel) or a fine aerosol mist thereof. Further, the types of electrospraying techniques may include: electrospraying in cone-jet mode, multi-jet mode or charge injection methods using either a single nozzle electrospray (ES) or multiple nozzles (i.e., multiplexed electrospray (MES)) enable liquid atomization, evaporation, and mixing with the oxidizer at low temperatures. Low temperature fuel injection avoids pre-combustion in the fuel-air mixing zone (e.g., where the ethanol boiling point=351.4 K, flash point<300 K; and the 1-butanol boiling point=390.7 K, flash point=308 K) and reduces the requirement for pre-heating the air or fuel, thereby reducing overall power consumption and size of the combustor. Conversely, alternative techniques for fuel injection cannot produce the droplet size or distribution required for adequate evaporation and mixing within a time frame/distance required for compact burner applications. Furthermore, alternative fuel injection techniques typically require large flow velocities limiting them to high flow rate applications. To achieve the high flow velocities, conventional fuel injectors require substantial liquid pressurization that is not feasible for compact and low power burner applications.

Neither the combustion of ethanol nor 1-butanol poison the catalyst, and consequently operation using a single catalyst can persist for longer periods of time than, for instance, with fuels having high sulfur content. Further, the combustion of ethanol and 1-butanol are extremely exothermic and occur via Equations 1 and 2 respectively, shown below:

$$CH_3CH_2OH + 3O_2 \rightarrow 2CO_2 + 3H_2O \quad \Delta H = -1407 \text{ kJ/mol} \quad (1)$$

$$CH_3CH_2CH_2CH_2OH + 6O_2 \rightarrow 4CO_2 + 5H_2O \quad \Delta H = -2713 \text{ kJ/mol} \quad (2)$$

The equivalence ratio ($\phi$) of a system, defined herein as the ratio of the fuel-to air/oxidizer ratio to the stoichiometric fuel-to air/oxidizer ratio, plays an important role in fuel conversion. Mathematically, the equivalence ratio is represented as:

$$\phi = \frac{\text{fuel-to-oxidizer ratio}}{(\text{fuel-to-oxidizer ratio})_{st}} \quad (3)$$

$$= \frac{m_{fuel}/m_{ox}}{(m_{fuel}/m_{ox})_{st}}$$

$$= \frac{n_{fuel}/n_{ox}}{(n_{fuel}/n_{ox})_{st}}$$

where m represents the mass flow rate, n represents the molar flow rate, and suffix st stands for stoichiometric conditions.

The ($\phi$)-value can be controlled by adjusting the amounts of fuel and/or oxygen that are reacted. Having a $\phi$-value of unity (1) signifies a stoichiometric feed of fuel and air, as shown in the above equations. With reactions having high $\phi$-values (i.e., values ranging from 0.75 to 3), the reaction is considered "fuel rich" and incomplete combustion occurs because not enough oxygen exists to combust the fuel. However, reactions having low $\phi$-values (i.e., values ranging from 0 to 0.75) indicate reactions having a "fuel lean" environment with plenty of oxygen to oxidize the fuel into its combustion products: carbon dioxide and water.

Various patents have been issued disclosing the use of a microcombustion-based thermoelectric generator. In particular, U.S. Pat. No. 6,951,456 to Adam L. Cohen et al. shows a design (e.g., a variation of a Swiss-roll type combustor) where the reactant channel and exhaust channels are coiled around each other in a spiral configuration so that heat loss is reduced. Some T-shaped or L-shaped fins are included as parts of the thermoelectric active wall. Additionally, some fins are extended in the reactant channel, while others are extended in the exhaust channel. These fins were designed to act as a diffusion barrier between the n-type and p-type Terillium (Te) materials and to increase the thermal gradient. However, in contrast to the embodiments described herein, the above mentioned patent is based on homogeneous combustion.

Additionally, published U.S. Patent Application 2007011146 discloses various catalytic converters to achieve complete combustion of liquid fuel using electrospray technologies with the cone-jet mode to produce fuel droplets in uniform size. It is to be noted however, that this previous patent investigated hydrocarbons and jet fuels as a source of fuel, while the present invention, among other things, utilizes oxygenates as fuel instead of hydrocarbons. This patent application also employed a thin mesh support layer for the catalyst limiting the potential production rates when compared to the foam support layer of the present invention. Further, the present invention demonstrates that a single reactor design is multi-functional and can operate in multiple modes including: reforming, bio-refinery, and combustion mode, as will be discussed in further detail below.

SUMMARY

In view of the foregoing, embodiments herein provide a process for converting liquid fuel to a product comprising providing a supply of nitrogen and oxygen gases; providing a supply of liquid fuel; electrically atomizing said fuel; evaporating the fuel; and catalytically reacting each of the liquid fuel, oxygen and nitrogen in a small or micro reactor.

Further, the liquid fuel may include oxygenates, such as alcohols, aldehydes, ketones, esters and carboxylic acids.

Additionally, the fuel is electrically atomized via an electrostatic injection device through electrospray in any one of cone jet mode, multi jet mode, and charge injection mode.

The process according to embodiments herein further includes vaporizing the fuel from a droplet size ranging from 4 to 25 µm.

Moreover, the product has a flow rate of less than 4 milliliters per hour per nozzle and the electrostatic injection device utilizes a power of less than 1 mW per nozzle with an external pressure of less than 10 psig applied thereto.

The catalytic reaction includes activating a catalytic oxidation reaction between a catalyst and each of the fuel, oxygen and nitrogen whereby a contact time between said catalyst and each of said fuel, oxygen and nitrogen is proportional to a thickness of said catalyst and inversely proportional to a flow rate through the catalyst. Additionally, the contact time is in a range between 290 ms and 550 ms and the reactor has a temperature ranging from 600 K to 873 K and a back pressure of less than 10 psig.

The product may include carbon dioxide and water whereby the product is produced by selecting an equivalence ratio of less than 1.

The product may also include heat for power generation by selecting an equivalence ratio of less than 1.

Additionally, the product may include carbon dioxide and water, having a carbon selectivity of 100%, a hydrogen selectivity of 100%, a conversion>95%, and a yield>95% (yield=conversion×selectivity) by selecting an equivalence ratio of 0.75.

The product may also include hydrogen and carbon monoxide, having a carbon selectivity up to 20%, a hydrogen selectivity up to 13%, a conversion>99%, and a yield up to 12% by selecting an equivalence ratio greater than 0.75 and less than 1.46.

The product may also include hydrogen and carbon monoxide, having a carbon selectivity up to 70%, a hydrogen selectivity up to 20%, a conversion>99%, and a yield>12% by selecting an equivalence ratio of 1.5.

The embodiments herein also provide a compact (i.e. cubic-centimeter scale) multi-functional reactor for converting liquid fuel to a product comprising a reactor having an electrostatic fuel injection device, a blank foam mixer, a fuel evaporation region and a catalyst.

The converter may further include a gas supplier to provide pure oxygen or air to the reactor.

These and other aspects of the embodiments herein will be better appreciated and understood when considered in conjunction with the following description and the accompanying drawings. It should be understood, however, that the following description, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
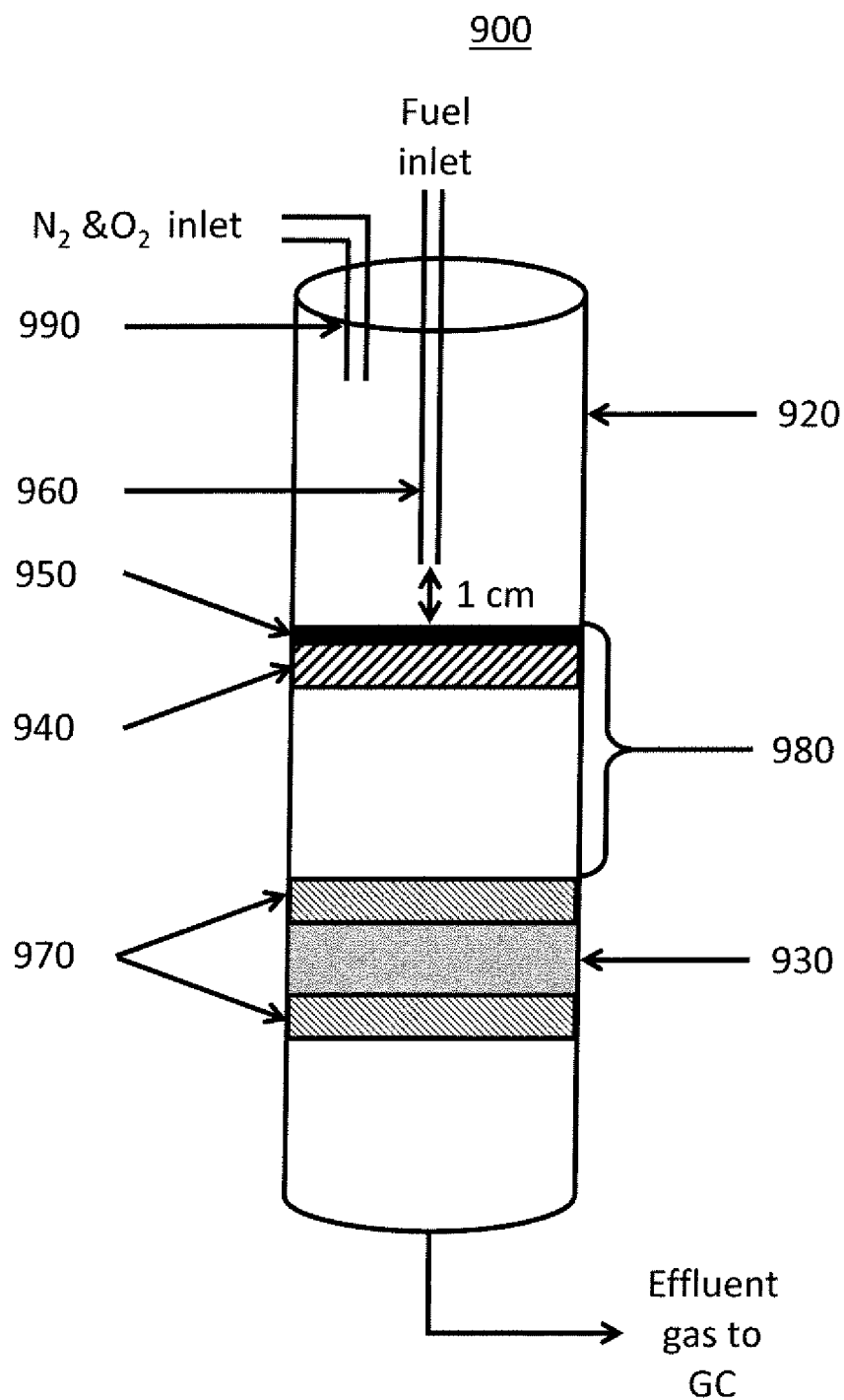
FIG. 1 illustrates a multi-functional fuel converter according to an embodiment described herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments described herein provide methods, tests and devices that include a multifunctional compact converter based on catalytic combustion and electrospray technologies to convert liquid fuel to a variety of products. Compact is defined as cubic-millimeter and cubic-centimeter size scales. Multifunctional describes the capability of the compact converter to operate in three different modes: complete combustion, hydrogen production, and olefin production. Complete combustion enables efficient production of heat for power generation applications. For example, power generation through the use of PbTe thermoelectrics where maximum conversion efficiency occurs for temperatures close to 773K. The hydrogen production mode enables fuel reformation for hydrogen fuel power generation. Olefin production enables production of synthetic jet-fuels.

Referring now to the drawings, and more particularly to FIGS. 1 through 8, where similar reference characters denote corresponding features consistently throughout the figures, there are shown preferred embodiments.

FIG. 1 is an illustration of a multi-functional compact converter according to an embodiment of the present invention. In particular, converter 900 generally includes reactor 920, an electrically grounded mesh or screen 950, catalyst 930, an inert blank foam mixer 940, a preheat region 980, and electrostatic fuel injection device 960.

The reactor 920 is made of a quartz/ceramic material and is generally cylindrical in shape. It is to be appreciated, however, that the reactor 920 may be designed having alternative shapes and sizes, and as such, the present invention is not limited thereto. Following from the direction of fuel injection device 960, which for purposes of the embodiment described herein, is the top of the converter 900, a grounded mesh or screen 950 is disposed below a droplet source (not shown) extending from and coupled to the electrostatic fuel injection device 960. Further, grounded mesh 950 is located at an approximate distance of 1 cm below the droplet source in order to have a large enough distance for the droplet to evaporate yet small enough distance to sustain the electrospray at a low voltage (e.g., 3500 V for single nozzle electrospray without an extractor electrode). Thus, the larger the distance between the droplet source and the grounded mesh, the more voltage or power is needed. Nitrogen and oxygen gases (i.e., air) are introduced through gas intake 990 and the effluent gas is released and sent to a gas chromatograph (GC) (not shown) through the bottom of the converter 900. It is to be appreciated that for purposes of example, nitrogen and oxygen in air were utilized, however, the present invention is not limited thereto. For instance, pure oxygen may also be utilized and introduced/supplied through gas intake 990. Additionally, liquid fuel may be introduced to reactor 920 via fuel injection device 960. It is to be appreciated that the liquid fuel may include various types of fuel, including but not limited to oxygenates having sufficient electrical conductivity for electro spray fuel injection or alcohols (i.e., ethanol and butanols). Once introduced, the fuel is flowed to the electrostatic fuel injection device 960 and electrostatically atomized by creating a voltage difference between the droplet source and grounded mesh 950 (e.g. 3500 V for single nozzle electrospray without an extractor electrode). Preferably, the fuel is electrosprayed using electrospraying techniques well known in the art, such as, for example, cone-jet mode, in order to ultimately assist in obtaining an optimum droplet size (e.g., 6 microns) or flow rate of less than 4 milliliters per hour per nozzle. Further, the fuel injection device 960 is well suited for a compact combustor with required minimal power of approximately 0.35 mW per nozzle with an external pressure of less than 1 psig being provided by a liquid pump (not shown) attached thereto. It is to be appreciated that other well known electrospraying techniques may be employed, such as, for example, multi jet mode, or charge injection, however, the present invention is not limited thereto.

An inert blank foam mixer 940 is located below grounded mesh 950 to aid in the mixing of the fuel vapor and any incoming nitrogen and oxygen gases. Additionally, grounded mesh 950 is perpendicular to the direction of the droplet trajectory in order to create a uniform electric field between it and the fuel injection device 960. It is to be appreciated that to predict the evolution of the droplet size with time to determine the overall optimum droplet size for the desired application, the Stephan Problem's differential mass balance was solved for a binary species in a spherically symmetric coordinate system with the radius being the only coordinate variable. Using the droplet mass conservation, the change in droplet mass, $m_d$, with time is equal to the rate at which the liquid is vaporized:

$$\frac{dm_d}{dt} = -\dot{m}. \tag{4}$$

where $\dot{m}$ represents the evaporation rate and is attained, in part, by assuming that at the droplet surface, the vapor mass fraction is $Y_{A,s}$ as shown below:

$$\dot{m} = 4\pi r_s \rho D_{AB} \ln\left(\frac{1 - Y_{A,\infty}}{1 - Y_{A,s}}\right), \tag{5}$$

where $r_s$ represents the droplet radius at the surface, $\rho$ represents the gas density, $D_{AB}$ represents the binary diffusion coefficient, and the vapor fraction at the droplet surface and an infinite distance away are $Y_{A,s}$ and $Y_{A,\infty}$ respectively. The mass of the droplet is simply the volume multiplied by the density. Plugging both this relationship, as well as Equation 5, into Equation 4 and rearranging yields the following differential equation:

$$\frac{dD^2}{dt} = -\frac{8\rho D_{AB}}{\rho_l} \ln(1 + B_y) \quad (6)$$

The natural log term was rewritten from the form seen in Equation 5. Then, by defining the right hand side of Equation 6 as a constant K, the equation can be integrated with the appropriate boundary conditions and has the following solution:

$$D^2(t) = D_o^2 - Kt. \quad (7)$$

Equation 7, also known as "the $d^2$-law," shows that that setting a D value of zero, and solving for t would represent the time it takes for the droplet to completely evaporate. Implicit in the derivation of the above model is that the ambient temperature does not exceed the boiling point of the droplet. This assumption eliminates the need to apply an energy balance to the liquid droplet or the gas envelope surrounding the droplet, greatly simplifying the number of equations and unknowns in the process. Thus, referring to FIG. 1, sufficient heat (e.g., a few degrees above the boiling point of the fuel) is supplied via a heating element (not shown) located on the outside of the reactor 920 creating a pre-heat region 980 near grounded mesh 950 and a foam mixer 940 to ensure complete evaporation or vaporization of the liquid fuel and to activate the catalyst 930 in the reactor 920. During start-up conditions, the pre-heating is achieved by an active heating element, while during operation, the heating element may be a passive heating element by heat reclamation processes. It is to be noted that any heating element well known in the art may be utilized, such as a heating tape.

The catalyst material 930 is a solid material that is placed between two inert, porous alumina supports 970 that act as heat shields and also serve as an additional mixing layer to ensure uniform fuel vapor concentration over the entire catalyst surface. Either a platinum metal mesh or a $Rh/Al_2O_3$ foam can be used as the catalyst, however, it is to be appreciated that the present invention is not limited thereto. For example, other catalysts suitable for use may be foams such as active metals on gamma-alumina or other oxide (e.g., ceria) support, monolith with active metals, active metals on oxide powder, as well as any solid surface coated with a catalytic layer. For purposes of the present embodiment, the platinum metal mesh had a weight of about 0.50 g and was roughly 0.5 mm thick. The $Rh/Al_2O_3$ foam (5 mm thick) contained 0.061 g of Rhodium (Rh) and was prepared in a manner detailed in "Rhodium Supported on Thermally Enhanced Zeolite as Catalysts for Fuel Reformation of Jet Fuels," Vol. 136 Catalysts Today p. 258-265 (2008) by Ivan C. Lee, which is incorporated herein by reference. The alumina monolith foam (80 pores per inch, 17 mm diameter, 5 mm thick) was coated with γ-alumina to roughen the foam surface and to increase the surface area. Then, the foam was calcined in a box furnace at 973 K for 15 hours. An aqueous $Rh(NO_3)_3$ solution was added to the foam, and the resultant foam was calcined in the box furnace at approximately 973K for a subsequent 15 hours. The contact time between the catalyst, fuel, nitrogen, and oxygen as well as the flow rate is dependent upon the thickness of the catalyst. That is, the thicker the catalyst material or smaller the flowrate, the greater the increase in contact time. Thus, as expressed via a formula, contact time=thickness (of the catalyst material)/flowrate.

Next, a general explanation of the converted products will be provided in further detail according to experiments conducted with reference to the embodiment of FIG. 1. An air tight seal was placed around the converter 900 and the gas chromatograph (GC) (not shown). The amounts of hydrogen, oxygen, nitrogen, carbon monoxide, carbon dioxide, methane, acetylene, ethane, ethylene, propane, propylene, butane, 1-butene, cis-2-butene, and trans-2-butene were monitored by an Agilent 4-channel micro-GC (not shown). Before each new iteration of fuel intake, nitrogen was first passed through the reactor 920 in order to clear out any lingering gases, to ensure that no leaks existed, and to ensure that no residual oxygen was present. Next, the pre-heat region 980 near grounded mesh 950 and catalyst 930 was activated to provide heat to the catalyst 930 as well as the region between the fuel injection device 960 and grounded mesh 950. After the appropriate nitrogen and oxygen flow rates were introduced according to the contact time and equivalence ratio, the grounded mesh 950 and catalyst 930 temperatures were allowed to equilibrate. A voltage differential between the grounded mesh 950 and the tube (not shown) of the fuel injection device 960 was established and as such, the fuel flow was initiated. Voltages were then adjusted (e.g. 3500 V for single nozzle electrospray without an extractor electrode) to maintain electrospray stability in cone-jet mode as observed visually. The grounded mesh 950 and catalyst 930 temperatures were again allowed to reach a steady state operating temperature (e.g. ranging from 600 K to 873 K) and the GC recorded the gas composition during this time. The overall contact time of the catalyst 930 with the fuel, nitrogen and oxygen ranged between 290 ms to 550 ms and further the back pressure of the reactor 920 was less than 10 psig. The equivalence ratio φ was varied, ranging from 0.18-3.2, thereby providing different products. For example, in 1-butanol combustion, for the equivalence ratio φ<1, carbon dioxide and water were selectively produced (i.e., with 100% carbon selectivity, 100% hydrogen selectivity, a conversion>95%, and a yield>95%). Additionally, under the same conditions, hydrogen and carbon monoxide yields were minimal. It is to be noted that selectivity is defined herein as how many atoms are converted to some other product and yield is expressed as conversion×selectivity which will be discussed in further detail below. Moreover, for the equivalence ratio φ>0.75 but <1.46, reformation products including syngas or hydrogen and carbon monoxide, were selectively produced (i.e., with up to 20% carbon selectivity, hydrogen selectivity up to 13%, a conversion>99%, and yield up to 12%).

Figure 2:
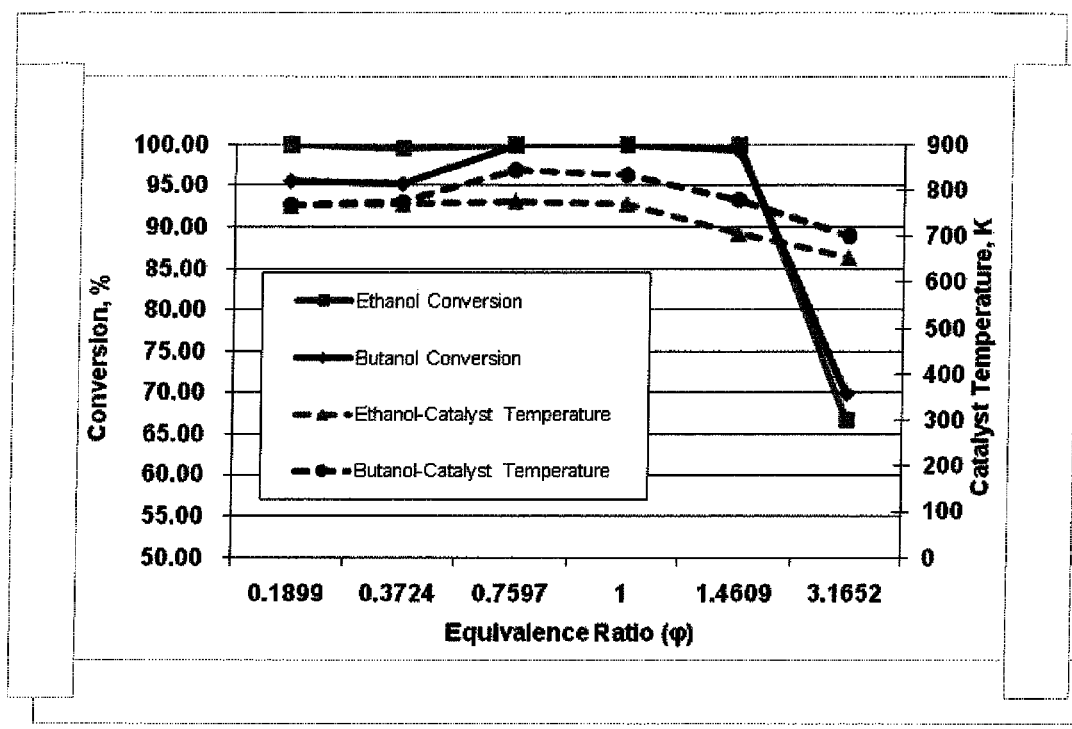
FIG. 2 is a graphical representation of the fuel conversion and catalyst temperature for ethanol and 1-butanol reactions.

FIG. 2 illustrates the fuel conversion and catalyst temperature for both ethanol and 1-butanol reactions as a function of the equivalence ratio. Conversions of over 95% were achieved for an equivalence ratio of φ<1.46. The catalyst temperature was between 673 and 823 K, which is ideal for intermediate temperature thermal electric devices made of, for example, PbTe.

When comparing ethanol and 1-butanol, the oxygen flow rate and then the nitrogen flow rate was adjusted so that the total volumetric flow rate of gas remained the same at each equivalence ratio in FIGS. 2 to 8. This step was performed to guarantee that the residence time inside the reactor 120 was the same for both fuels, thus eliminating other variables that could cloud the results such as, for example, fuel density and number of carbons in the molecular formula. Fuel flow rates of 1 mL/hr were used for a single nozzle. The mean droplet diameter for ethanol at this flow rate was estimated to be 8.1 microns Phase Doppler Particle Analysis (PDPA) measurements.

For purposes of the embodiment described herein, conversion was defined based on a carbon balance. In particular, the carbon atoms in all of the products were summed, and were then divided by the total amount of carbons in the fuel (i.e., ethanol or 1-butanol) fed into the reactor. This represents the percentage of carbon atoms that were converted into some compound or product other than the fuel.

Carbon selectivity was defined as the number of carbon atoms in a particular species, divided by the total number of carbon atoms in the product gas as shown in the equation 8 below:

$$C_{atom\ selectivity} = \frac{\#\ C\ in\ Species\ X}{\sum C\ in\ product} \quad (8)$$

Similarly, hydrogen selectivity was defined as the number of hydrogen atoms in a particular species divided by the total number of hydrogen atoms in the product gas. This represents the percentage of converted hydrogen atoms in each of the species studied and is shown in the equation 9 below:

$$H_{atom\ selectivity} = \frac{\#\ H\ in\ Species}{\sum H\ in\ product} \quad (9)$$

The chemistry behind the catalyst surface reactions that result in production of the gases mentioned above have been studied extensively in the literature, but in particular ethanol adsorption and subsequent decomposition on a rhodium surface was investigated. In particular, it has been found that ethanol initially forms an ethoxy species on the surface of the catalyst before creating a bridged oxametallacycle. Subsequently, it undergoes Carbon-Carbon (C—C) bond scission, and is broken down into Hydrogen (H), Carbon (C), and Oxygen (O) atoms that then recombine to produce syngas (hydrogen and carbon monoxide).

Figure 3:
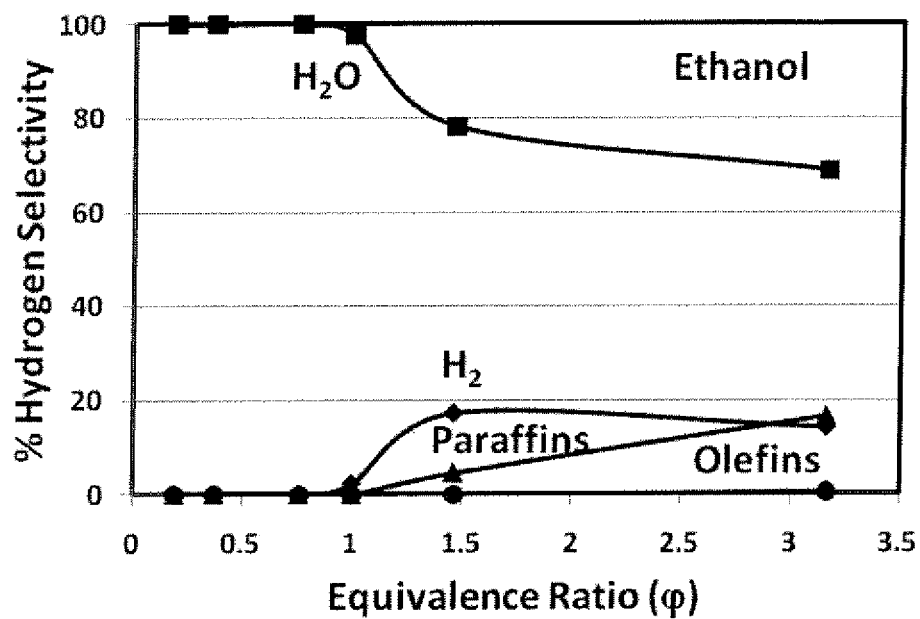
FIG. 3 is a graphical representation of the hydrogen selectivity for ethanol combustion.

FIG. 3 is a graphical illustration of the hydrogen selectivity for ethanol combustion. In FIG. 3, it is shown that nearly all of the hydrogen atoms are present as water vapor at a low equivalence ratio (i.e., where $\phi<1$). Further, as the stoichiometric ratio is approached and the equivalence ratio increases, more hydrogen gas and paraffins were produced as less and less water vapor is formed. However, even at equivalence ratios where $\phi>3$, the hydrogen selectivity for water vapor is still around 70%. The hydrogen selectivity for $H_2$ peaked at approximately 18% and occurred at an equivalence ratio of $\phi\approx1.5$. It was noticed that hydrogen selectivity for paraffins was higher with higher equivalence ratios, and only trace amounts of olefins were detected.

Figure 4:
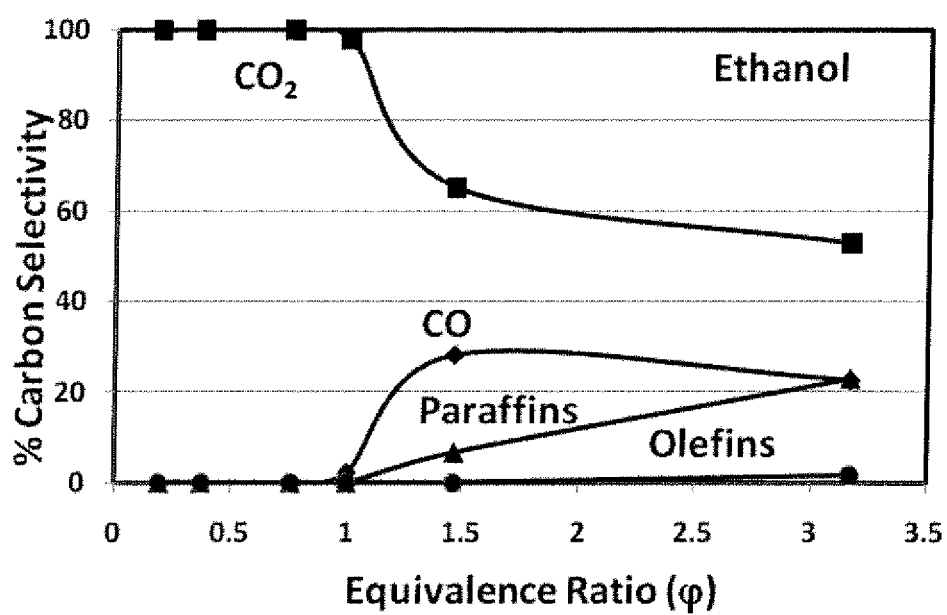
FIG. 4 is a graphical representation of the carbon selectivity for ethanol combustion.

The carbon selectivities for ethanol combustion for carbon monoxide, carbon dioxide, paraffins, and olefins with increasing equivalence ratios are shown in FIG. 4.

Referring to FIG. 4, the graph shows that two distinct regimes exist for carbon selectivity. In particular, at low equivalence ratios where $\phi<1$, where excess oxygen is present, the selectivity of carbon to $CO_2$ is 100%. This is partially due to the fact that any CO produced will be immediately oxidized by the excess oxygen into $CO_2$. If $CO_2$ is produced, that means that combustion is occurring and that water is the other product. Since those are the only products produced at low equivalence ratios, this is the regime of complete combustion. Note that as the equivalence ratio approaches unity, the selectivity of carbon for $CO_2$ starts to decrease. Further, as the ratio of ethanol to oxygen is increased, more carbon monoxide, methane, and ethylene are produced as the carbon selectivity of carbon dioxide decreases. The appearance of significant amounts of CO indicates that the fuel is being reformed into CO and $H_2$ (syngas).

Figure 5:
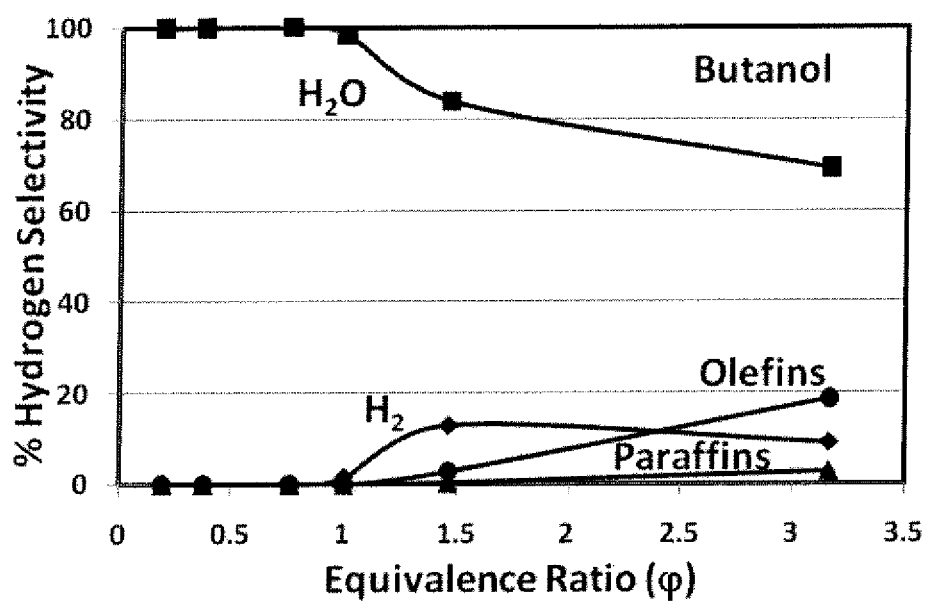
FIG. 5 is a graphical representation of the hydrogen selectivity for 1-butanol combustion.

The hydrogen selectivities for 1-butanol combustion are shown in FIG. 5. It is to be noted that the results appear similar to the hydrogen selectivity for ethanol combustion. The hydrogen selectivity for water vapor begins to decrease around the stoichiometric ratio, and further decreases to a final value of approximately 70%. Hydrogen gas selectivity increased for equivalence ratio where $\phi>1$, and then slightly decreased to final values roughly 15% and 10% respectively for ethanol and 1-butanol combustion. The main difference between ethanol and 1-butanol was the amount of olefins and paraffins produced as discussed above. Specifically, ethanol combustion produced a hydrogen selectivity of nearly 20% for paraffins yet no olefins at a equivalence ration $\phi=3.17$, whereas conversely, 1-butanol combustion produced a hydrogen selectivity of slightly less than 20% for olefins and about 3% for paraffins.

Figure 6:
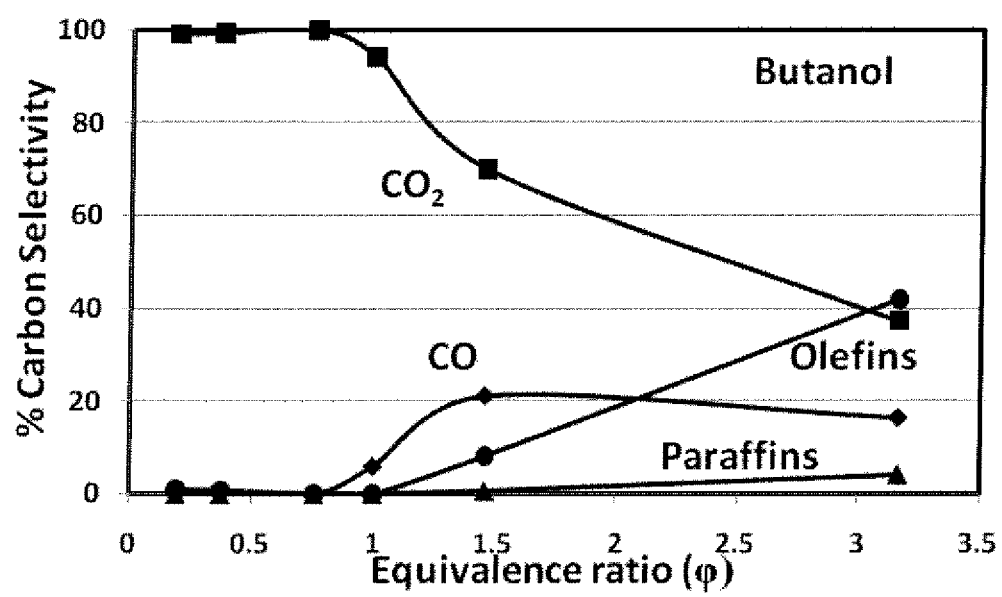
FIG. 6 is a graphical representation of the carbon selectivity for 1-butanol combustion.

The carbon selectivity for 1-butanol combustion using as a function of the equivalence ratio for $Rh/Al_2O_3$ is shown in FIG. 6 in an analogous manner to FIG. 5. FIG. 6 shows the carbon selectivity for 1-butanol combustion, and the trend is very similar to that of ethanol shown in FIG. 5. As shown, $CO_2$ has a nearly 100% carbon selectivity until the stoichiometric fuel to air ratio is approached. After that, the $CO_2$ selectivity rapidly decreases to a final value of less than 40%. A comparison of FIGS. 4 and 6 shows that the carbon selectivity for $CO_2$ decreases much further for 1-butanol than for ethanol combustion, and this corresponds to larger amounts of other products being formed.

Figure 7:
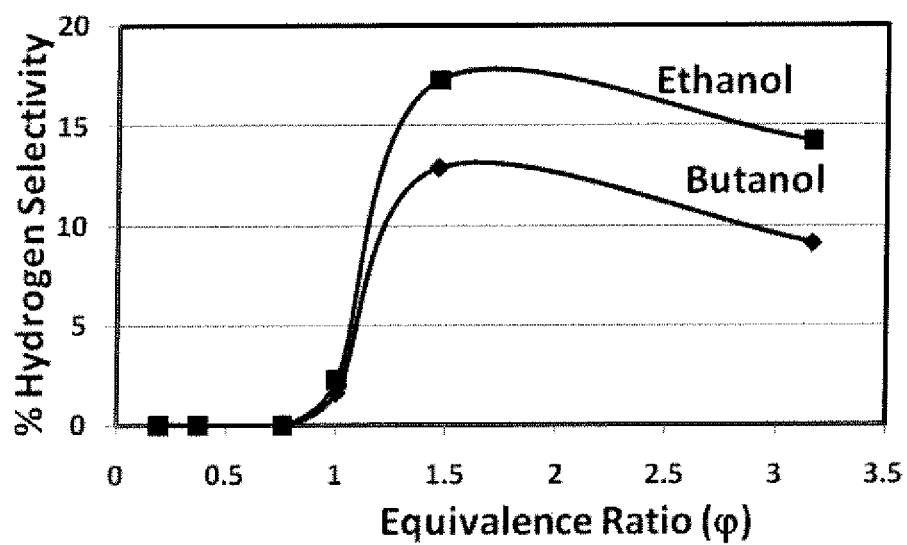
FIG. 7 is a graphical representation of the comparison of the hydrogen production for ethanol and 1-butanol as function of the equivalence ratio for the foam catalyst.

Referring to FIG. 7, shown is a comparison of the hydrogen selectivities for ethanol and 1-butanol as a function of the equivalence ratio for the $Rh/Al_2O_3$ foam catalyst. Shown is that ethanol combustion produces a higher hydrogen selectivity for $H_2$ gas at all equivalence ratios. Thus, for the range of equivalence ratios disclosed with reference to the graph and embodiments herein, ethanol is better suited for fuel reformation than 1-butanol. Moreover, having an equivalence ratio of $\phi\approx1.5$ produces the highest hydrogen selectivity for both ethanol and 1-butanol. Consequently, it is to be noted that this would be an ideal equivalence ratio at which to operate if $H_2$ production for fuel cells is required.

Figure 8:
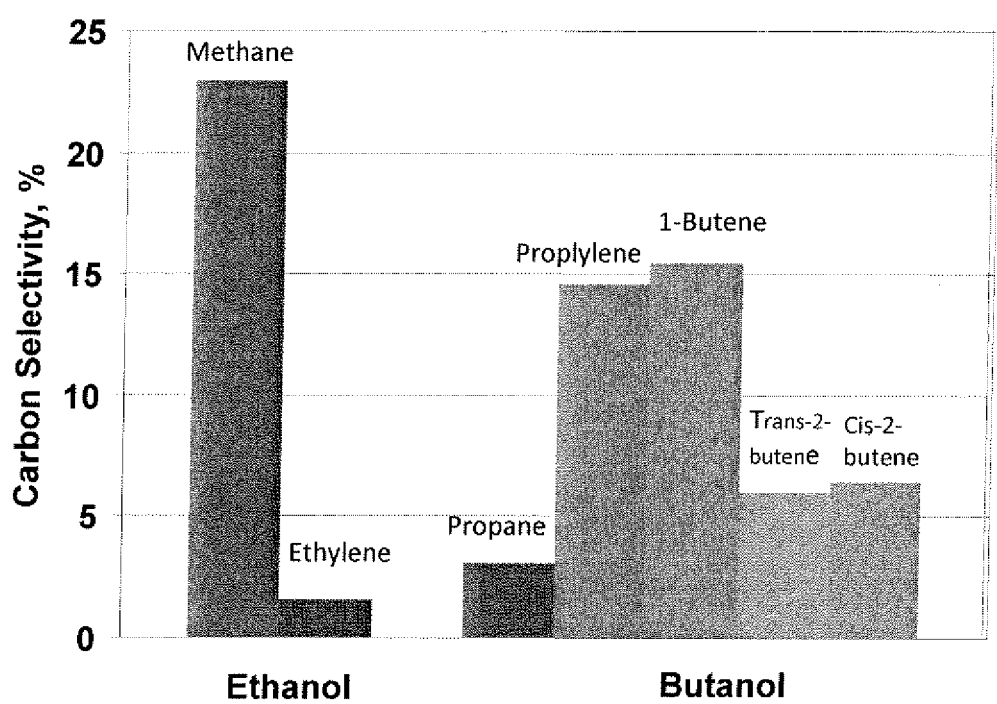
FIG. 8 is a graphical representation of the production of paraffins and olefins from ethanol and 1-butanol.

FIG. 8 is a graphical representation of the production of paraffins and olefins from ethanol and 1-butanol at an equivalence ratio of $\phi=3.2$. Ethanol combustion at the equivalence ratio of $\phi=3.2$ produces much more paraffins (methane) than olefins (ethylene). In contrast, 1-butanol combustion at the same equivalence ratio of $\phi=3.2$ produces more olefins. As shown, carbon selectivity for $CO_2$ decreases much greater for 1-butanol than for ethanol combustion, which consequently corresponds to larger amounts of other products being formed.

It is to be noted that about 60% of the total carbons for 1-butanol combustion as compared to only about 45% of the total carbons in ethanol combustion, are found in a compound or product other than $CO_2$ at an equivalence ratio $\phi=3.2$. Approximately 25% and 45% of the carbons for ethanol and 1-butanol combustion, respectively are in the form of paraffins and olefins as shown in FIG. 8. Additionally, the comparison demonstrates that olefins (e.g., 14.5% propylene, 15.5% 1-butene, 6.0% trans-2-butene and 6.5% cis-2-butene) are produced for 1-butanol combustion in significant amounts, whereas only trace amounts of olefins (e.g., 0.57% ethylene) were produced for ethanol combustion. The converse is true of paraffins. That is, more paraffins are found for ethanol than are found for 1-butanol combustion. The carbon selectivities are 22.9% methane in ethanol combustion and only 3.1% propane in 1-butanol combustion. It is to be noted that this conversion of fuel into paraffins and olefins has promise for use in other bio-refinery technologies known in the art.

As will be appreciated by one skilled in the art, the embodiments described herein may be embodied as the foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A multi-functional compact fuel converter apparatus to provide heat, hydrogen and olefins comprising:
   a reactor;
   a continuous supply of fuel to the top of the reactor;
   a continuous supply of oxygen to the top of the reactor;
   an electrostatic atomized fuel injection device located in the reactor below said supply of fuel and said supply of oxygen;
   a droplet source extending from and coupled to the fuel injection device;
   a grounded mesh screen located below the fuel injection device, wherein a voltage difference applied between the droplet source and the grounded mesh creates an electrospray, the grounded mesh screen being located approximately 1-2 cm from the droplet source to sustain the electrospray;
   a pre-heat region in the reactor below said supply of fuel and said supply of oxygen having sufficient temperature and length to fully vaporize said atomized liquid fuel;
   a source of heat for vaporization of atomized liquid fuel;
   a fuel-oxidizer mixing region in the reactor; and
   a catalyst on a foam support near the bottom of the reactor.

2. The apparatus of claim 1, wherein said electrostatic fuel injection device electrically atomizes said liquid fuel through electrospray in any one of cone-jet mode, multi jet mode, and charge injection mode to form uniform droplets less than 25 microns in diameter, which are uniformly spaced.

3. The apparatus of claim 2, wherein said electrostatic fuel injection device utilizes a power of less than 1 mW per nozzle with an external pressure less than 10 psig applied thereto.

4. The apparatus of claim 1, wherein the catalyst support is an $Al_2O_3$ foam between 10-100 pores per square inch.

5. The apparatus of claim 1, wherein the catalyst is rhodium or other active metals deposited on a gamma $Al_2O_3$ support.

6. The apparatus of claim 1, wherein the mixing region contains $Al_2O_3$ foam.

7. The apparatus of claim 1, wherein the voltage difference applied between the droplet source and the grounded mesh is 3500V.

* * * * *